US010577898B2

(12) United States Patent
Livanec et al.

(10) Patent No.: US 10,577,898 B2
(45) Date of Patent: Mar. 3, 2020

(54) RUNNING FLUID FOR USE IN A SUBTERRANEAN FORMATION OPERATION

(71) Applicant: Halliburton Energy Services, Inc., Houston, TX (US)

(72) Inventors: Philip Wayne Livanec, Houston, TX (US); Chesnee Lae Davis, The Woodlands, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 184 days.

(21) Appl. No.: 15/555,055

(22) PCT Filed: Apr. 2, 2015

(86) PCT No.: PCT/US2015/024132
§ 371 (c)(1),
(2) Date: Aug. 31, 2017

(87) PCT Pub. No.: WO2016/160024
PCT Pub. Date: Oct. 6, 2016

(65) Prior Publication Data
US 2018/0038178 A1 Feb. 8, 2018

(51) Int. Cl.
E21B 43/10 (2006.01)
E21B 33/14 (2006.01)
(Continued)

(52) U.S. Cl.
CPC .......... E21B 43/10 (2013.01); C09K 8/03 (2013.01); C09K 8/032 (2013.01); E21B 21/08 (2013.01); E21B 33/14 (2013.01)

(58) Field of Classification Search
None
See application file for complete search history.

(56) References Cited

U.S. PATENT DOCUMENTS 2,326,950 A    8/1943  Kepfer
4,082,677 A *  4/1978  Zollar ............... C01B 25/18
                                                    252/1
(Continued)

FOREIGN PATENT DOCUMENTS

AU    2013205934      5/2013
EP    2586754 A1      5/2013
(Continued)

OTHER PUBLICATIONS

Internatonal Search Report and Written Opinion from PCT/US2015/024132, dated Dec. 31, 2015, 12 pages.
(Continued)

Primary Examiner — Andrew Sue-Ako
(74) Attorney, Agent, or Firm — Tenley Krueger; C. Tumey Law Group PLLC

(57) ABSTRACT

Methods including introducing a running fluid into a subterranean formation, the running fluid comprising a base fluid and a weighting agent and having a specific gravity in the range of about 1.05 to about 3.0, and a 600 rpm shear stress of less than about 26.3 Pa, wherein the 600 rpm shear stress is measured at a shear rate of 600 rpm and a temperature of about 48.9° C.; and running a tubular into the subterranean formation comprising the running fluid.

21 Claims, 3 Drawing Sheets

(51) Int. Cl.
*C09K 8/03* (2006.01)
*E21B 21/08* (2006.01)

(56) References Cited

U.S. PATENT DOCUMENTS

| | | |
|---|---|---|
| 4,422,855 A | 12/1983 | Sawyer, Jr. |
| 5,030,366 A | 7/1991 | Wilson et al. |
| 5,248,641 A | 9/1993 | Bauer et al. |
| 5,330,006 A | 7/1994 | Nahm et al. |
| 5,969,006 A | 10/1999 | Onan et al. |
| 7,456,135 B2 | 11/2008 | Kirsner et al. |
| 8,476,201 B2 * | 7/2013 | Miller .................. C09K 8/03 507/143 |
| 8,598,090 B2 | 12/2013 | Svoboda et al. |
| 2002/0028750 A1 | 3/2002 | Dobson et al. |
| 2003/0176291 A1 | 9/2003 | Rayborn |
| 2008/0015118 A1 | 1/2008 | Oyler et al. |
| 2008/0169130 A1 | 7/2008 | Norman et al. |
| 2011/0136701 A1 | 6/2011 | Prebensen et al. |
| 2011/0172130 A1 | 7/2011 | Sarap et al. |
| 2012/0067575 A1 | 3/2012 | Luyster et al. |
| 2013/0092376 A1 | 4/2013 | Al-Subhi et al. |
| 2014/0166285 A1 | 6/2014 | Santra et al. |

FOREIGN PATENT DOCUMENTS

| | | |
|---|---|---|
| WO | WO-2006101606 A2 | 9/2006 |
| WO | WO-2010027366 A1 | 3/2010 |
| WO | WO-2010080132 A1 | 7/2010 |
| WO | WO-2013040427 A2 | 3/2013 |
| WO | WO-2014011587 A1 | 1/2014 |
| WO | WO-2014102388 A2 | 7/2014 |

OTHER PUBLICATIONS

Lim et al., "New Surfactant Allows for Higher Internal Phase in Non-Aqueous Systems," 2001, American Association of Drilling Engineers, AADE-11-NTCE-06, 11 pages.

* cited by examiner

RUNNING FLUID FOR USE IN A SUBTERRANEAN FORMATION OPERATION

BACKGROUND

The present disclosure relates to subterranean formation operations and, more particularly, to a running fluid for use in running a tubular into a subterranean formation.

Wellbores are often drilled into subterranean formations (or simply "formation") to recover hydrocarbons (e.g., oil and/or gas) therefrom. In constructing such wellbores and preparing them for hydrocarbon recovery, it is often necessary to run a tubular into the wellbore (e.g., in preparation of a cementing operation). Such tubulars are frequently referred to as casing or liner string, and encompasses any conduit including pipe, tubing, coiled tubing, and the like. The tubulars are run into the subterranean formation with a running fluid in the formation.

Challenges encountered during running such tubulars include effectively managing wellbore pressure, as the wellbore is exposed to surge and swab pressures during the running. Specifically, the running contributes to pressures in the wellbore that can be expressed in terms of equivalent circulating density (ECD), which are additional pressures exerted on the formation that can induce fractures, lost circulation, or collapse of the tubular. Tubular running must also be performed while avoiding increased surge pressures and slow tubular-running speeds, and avoiding sag of any additives (e.g., weighting agents, and the like) included in the running fluid. As used herein, the term "sag" refers to the settling of particulates in the annulus of a wellbore from a static or circulated fluid. Additionally, if the tubular is run in preparation for a cementing operation, induced fractures may cause the wellbore to take on losses, reducing the likelihood of achieving a quality cementing operation as the height allowance for the pumped cement may be reduced. Accordingly, ECD management is critical to ensure that the pressure within the wellbore during tubular running stays within the pore pressure and fracture gradient pressure window. As used herein, the term "fracture gradient pressure" or "fracture gradient" refers to the pressure required to induce fractures in a subterranean formation at a given depth.

Particular wellbore configurations or formation compositions may pose greater challenges than others. For example, depleted zones in a formation may pose an ECD challenge as well as a lost circulation hazard because of the regression of the pore pressure and the fracture gradient compared with the surrounding formation strata. Additionally, depleted zones may pose a stuck pipe hazard due to overbalanced densities of surrounding running fluids, resulting in extreme differential pressures in relation to the depleted zone pressure. As another example, highly deviated wells (i.e., wellbores drilled at high-angles) may result in poor wellbore cleaning, which adversely affects ECD. For instance, in deviated wells having deviated angles of greater than about 30°, cutting beds may form due to an insufficient pump rate, leading to excessive ECD, pack-offs, and/or stuck pipe. Furthermore, highly deviated wells increase the likelihood (present in all wellbores) of sag (e.g., barite sag) from the running fluid. Such sag may result in density differentials in the running fluid and, thus, in the fluid column in the wellbore, which may cause significant differences in pressure exerted on the formation. The resultant fluctuations in pressure may increase the potential for fracturing the formation, as well as inducing an influx of formation fluid.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
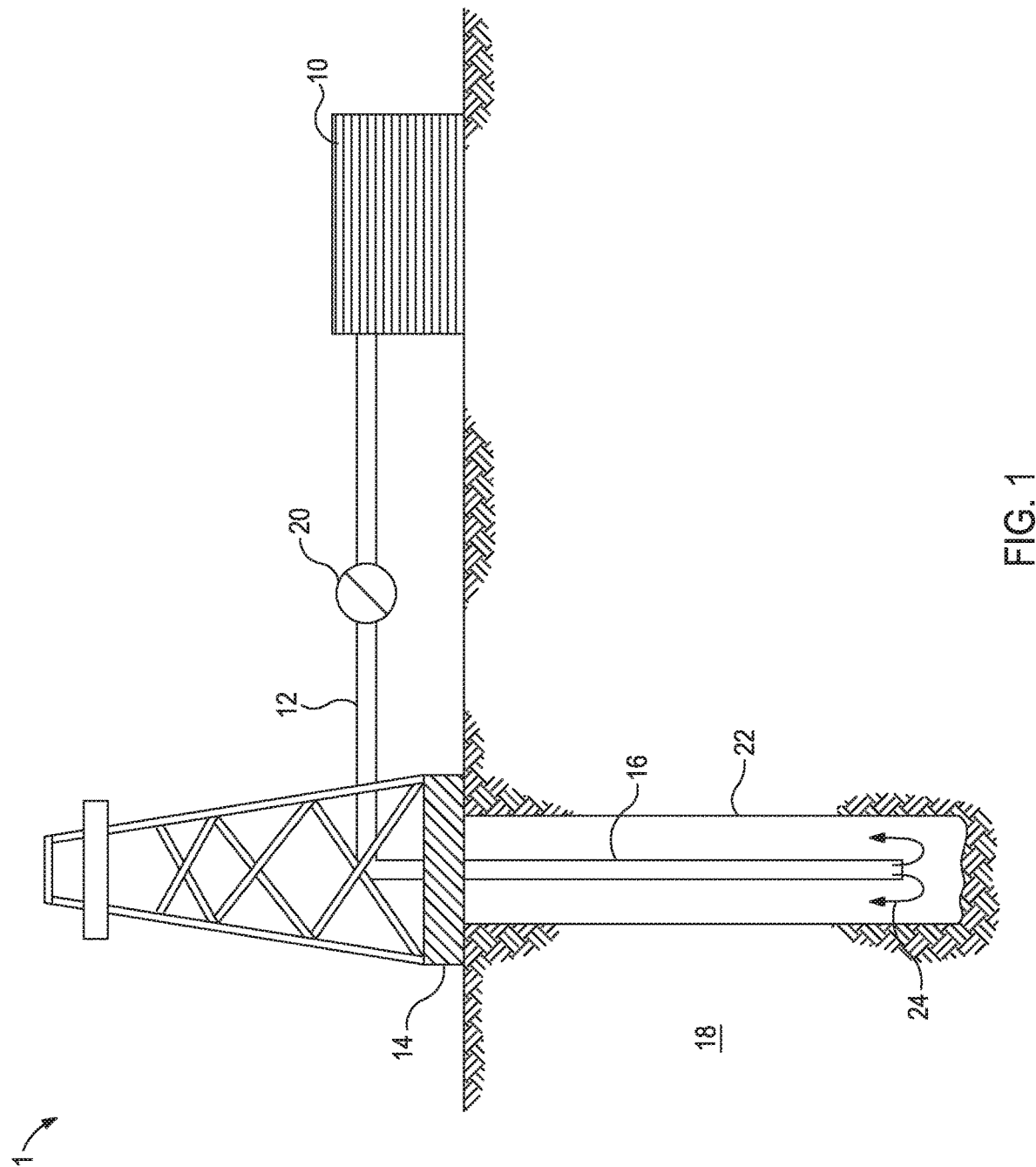
FIG. 1 depicts a wellbore system for introducing a runner fluid into a formation for performing a tubular running operation, according to one or more embodiments of the present disclosure.

The present disclosure relates to subterranean formation operations and, more particularly, to a running fluid for use in running a tubular into a subterranean formation. Specifically, the present disclosure relates to a low-ECD running fluid that may operate within the narrow window between the pore pressure and the fracture gradient of a subterranean formation during the running of a tubular, as well as resist sag.

The running fluid of the present disclosure allows an operator to effectively manage wellbore pressures during the running of a tubular into a formation. Specifically, the running fluids described herein may have low viscosity while resisting sag, and may allow, inter alia, for controlled ECD management, improved wellbore cleaning, reduced stuck pipe risk, reduced pack off risk, improved lost circulation control, and increased running times. When the tubular is run in preparation of a cementing operation, the low-ECD running fluid described herein may additionally reduce the pressure effects of the cementing operation because the low-ECD running fluid will be maintained in the wellbore above the cement as the cementing operation is performed.

Moreover, the running fluids of the present disclosure do not require the rigors necessary for typical treatment fluids used in subterranean formation operations including, but not limited to, solids and contamination resistance, fluid loss control agents, excess emulsifiers, the ability to suspend cuttings, and the like. Indeed, traditional running fluids may be composed by thinning already formulated drilling fluids, which may result in a significant risk of sag and/or significant costs associated with already included micronized weighting agents. Other methods for completing a tubular running operation have included displacement to a weighted brine, which may be time-extensive, often incompatible with oil-based fluids, and potentially toxic, or completing a wellbore strengthening operation prior to running the tubular, which also may be time-extensive, potentially unsuccessful, and costly in terms of additional product.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely but not necessarily wholly.

In some embodiments, the present disclosure provides a method of performing a tubular running operation. The tubular may be any tubular suitable for use in a subterranean formation operation and may include, but is not limited to, a casing string, a liner (or liner string), a screen (e.g., a mud screen, production screen, and the like), and any combination thereof. For example, the tubular may extend into the subterranean formation and contact the running fluid introduced herein. The running fluid may surround the tubular, including either or both of the interior of the tubular and the exterior of the tubular. In doing so, the running fluid of the present disclosure may reduce ECD, surge, and swab effects placed on the tubular during the tubular running operation. Moreover, hardware that may be employed to reduce such effects may synergistically operate with the running fluid of the present disclosure to further reduce the effects of ECD, surge, and swab.

The methods described herein employ a running fluid comprising a base fluid and a weighting agent, which may be introduced into a subterranean formation to run a tubular therein. The running fluid is designed such that the tubular running operation in combination with the running fluid permits the running of the tubular therein without exceeding the fracture gradient pressure of the formation, while being capable of resisting sag of the weighting agents comprised therein. Moreover, the rheology properties of the running fluids described herein are restricted to relatively flat rheological profiles having thin upper rheology and relatively high low end rheology, such that they exhibit shear-thinning qualities. As described herein, the term "shear thinning" refers to a fluid with a viscosity that decreases with an increase in shear.

Specifically, the running fluid has a specific gravity in the range of from a lower limit of about 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, and 2.0 to an upper limit of about 3.0, 2.95, 2.9, 2.85, 2.8, 2.75, 2.7, 2.65, 2.6, 2.55, 2.5, 2.45, 2.4, 2.35, 2.3, 2.25, 2.2, 2.15, 2.1, 2.05, and 2.0 (i.e., from about 9 pounds per gallon (ppg) to about 25 ppg), encompassing any value and subset therebetween. For example, in some embodiments, without limitation, the specific gravity may be in the range of about 1.05 to about 2.6 (i.e., about 9 ppg to about 22 ppg), or about 1.25 to about 2.6 (i.e., about 10 ppg to about 22 ppg), or about 1.8 to about 2.6 (i.e., about 18 ppg to about 22 ppg), or about 1.8 to about 2.4 (i.e., about 18 ppg to about 20 ppg), encompassing any value and subset therebetween, without departing from the scope of the present disclosure. Each value is critical to the methods described herein and may depend on a number of factors including, but not limited to, the specific tubular running operations being performed, the tubular in use, the expected ECD, surge, and swab effects, and the like.

Additionally, the running fluid has a 600 revolutions per min (rpm) shear stress of less than about 26.3 Pascal (Pa) (i.e., less than about 55 pounds per 100 square feet (lb/100 ft$^2$)). The term "600 rpm shear stress" refers to a measured shear stress at a shear rate of 600 rpm and a temperature of about 48.9° C. (i.e., about 120° F.) using a FANN® 35 Viscometer equipped with a R1 rotor sleeve, a B1 bob, and an F1 torsion spring.

In some embodiments, the running fluid may further have a "3 rpm shear stress," referred to herein as a measured shear stress at a shear rate of 3 rpm and a temperature of about 48.9° C. (i.e., about 120° F.) using a FANN® 35 Viscometer equipped with a R1 rotor sleeve, a B1 bob, and an F1 torsion spring. In some embodiments, the running fluid may be additionally defined by comparing the difference (i.e., the subtracted difference) between the 600 rpm shear stress and the 3 rpm shear stress. For example, the running fluid may be defined as additionally having a difference between the 600 rpm shear stress and the 3 rpm shear stress of between a lower limit of about 2.4 Pa, 3.2 Pa, 4.0 Pa, 4.8 Pa, 5.6 Pa, 6.4 Pa, 7.2 Pa, 8.0 Pa, 8.8 Pa, 9.6 Pa, 10.4 Pa, 11.2 Pa, 12.0 Pa, 12.8 Pa, and 13.6 Pa and an upper limit of about 26.3 Pa, 25.5 Pa, 24.7 Pa, 23.9 Pa, 23.1 Pa, 22.3 Pa, 21.5 Pa, 20.7 Pa, 19.9 Pa, 19.1 Pa, 18.3 Pa, 17.5 Pa, 16.7 Pa, 15.9 Pa, 15.1 Pa, 14.3 Pa, and 13.5 (i.e., between about 5 lb/100 ft$^2$ and about 55 lb/100 ft$^2$), encompassing any value and subset therebetween. Without limitation, in some embodiments, the difference between the 600 rpm shear stress and the 3 rpm shear stress of the running fluid may be between about 2.4 Pa and about 21.5 Pa (i.e., between about 5 lb/100 ft$^2$ and about 45 lb/100 ft$^2$), or between about 2.4 Pa and about 16.8 Pa (i.e., between about 5 lb/100 ft$^2$ and about 35 lb/100 ft$^2$), or between about 2.4 Pa and about 12.0 Pa (i.e., between about 5 lb/100 ft$^2$ and about 25 lb/100 ft$^2$), or between about 2.4 Pa and about 7.2 Pa (i.e., between about 5 lb/100 ft$^2$ and about 15 lb/100 ft$^2$), or between about 2.4 Pa and about 4.8

Pa (i.e., between about 5 lb/100 ft$^2$ and about 10 lb/100 ft$^2$), encompassing any value and subset therebetween, without departing from the scope of the present disclosure.

In some embodiments, the plastic viscosity (PV) of the running fluids described herein may have a viscosity in the range of from a lower limit of about 0.005 pascal seconds (Pa*s), 0.006 Pa*s, 0.007 Pa*s, 0.008 Pa*s, 0.009 Pa*s, 0.01 Pa*s, 0.011 Pa*s, 0.012 Pa*s, 0.013 Pa*s, 0.014 Pa*s, 0.015 Pa*s, 0.016 Pa*s, 0.017 Pa*s, and 0.018 Pa*s to an upper limit of about 0.035 Pa*s, 0.034 Pa*s, 0.033 Pa*s, 0.032 Pa*s, 0.031 Pa*s, 0.03 Pa*s, 0.029 Pa*s, 0.028 Pa*s, 0.027 Pa*s, 0.026 Pa*s, 0.025 Pa*s, 0.024 Pa*s, 0.023 Pa*s, 0.022 Pa*s, 0.021 Pa*s, 0.02 Pa*s, 0.018 Pa*s, and 0.019 Pa*s (i.e., about 5 cP to about 35 cP), encompassing any value and subset therebetween. As used herein, the term "plastic viscosity" refers to the slope of the shear stress/shear rate line above the yield point. Additionally, in some embodiments, the yield point (YP) of the running fluids described herein may have a shear stress in the range of from a lower limit of about 0.001 Pa, 0.005 Pa, 0.01 Pa, 0.015 Pa, 0.02 Pa, 0.025 Pa, 0.03 Pa, 0.035 Pa, 0.04 Pa, 0.045 Pa, 0.05 Pa, 0.055 Pa, 0.06 Pa, 0.065 Pa, 0.07 Pa, 0.075 Pa, 0.08 Pa, 0.085 Pa, 0.09 Pa, 0.095 Pa, and 0.1 Pa to an upper limit of about 0.206 Pa, 0.195 Pa, 0.19 Pa, 0.185 Pa, 0.18 Pa, 0.175 Pa, 0.17 Pa, 0.165 Pa, 0.16 Pa, 0.155 Pa, 0.15 Pa, 0.145 Pa, 0.14 Pa, 0.135 Pa, 0.13 Pa, 0.125 Pa, 0.12 Pa, 0.15 Pa, and 0.1 Pa (i.e., about 1 lb/100 ft$^2$ to about 206 lb/100 ft$^2$), encompassing any value and subset therebetween.

In some embodiments, the running fluid may be recovered from the formation after completion of the tubular running operation and recycled or otherwise reused as, without limitation, a displacement fluid or for building a new treatment fluid for use in any other subterranean formation operation, including another tubular running operation. This may be particularly true given the rheology of the running fluid without the need for large amounts of traditional additives thereto, which may hinder recycling or reuse of traditional fluids used in tubular running operations, such as due to elevated reprocessing costs and/or time.

In some embodiments, the base fluid in the running fluid described herein may be an aqueous base fluid or an oil base fluid. Suitable aqueous base fluids may include, but are not limited to, fresh water, saltwater (e.g., water containing one or more salts dissolved therein), brine (e.g., saturated salt water), seawater, and any combination thereof. Generally, the water may be from any source, provided that it does not contain components that might adversely affect the rheology and/or performance of the running fluid, as described above. Suitable oil base fluids may include, but are not limited to, alkanes, olefins, aromatic organic compounds, cyclic alkanes, paraffins, diesel fluids, mineral oils, desulfurized hydrogenated kerosenes, esters, carbonates, crude oils, and any combination thereof. A suitable commercially available oil base fluid may include, but is not limited to, DF-1, a refined mineral oil base fluid with less than 2% aromatic content, available from Total S.A. in Paris, France.

The weighting agents described herein may be any weighting agent sufficient for use in a subterranean formation operation (e.g., a tubular running operation) capable of achieving the desired specific gravity and 600 rpm viscosity described herein. Suitable weighting agents may be composed of a material including, but not limited to, barite, calcium carbonate, hematite, hausmannite, sand, silica flour, cement, ilmenite, manganese oxide, manganese tetraoxide, magnetite, siderite, celestite, dolomite, olivine, calcite, halite, strontium sulfate, galena, and any combination thereof. An example of a suitable commercially available weighting agent for use in the embodiments described herein may include, but is not limited to, CIMBAR® UF, a barite weighting agent, available from Cimbar Performance Minerals in Chatsworth, Ga.

In some embodiments, the weighting agents may be substantially spherical, but may additionally be substantially non-spherical, without departing from the scope of the present disclosure. For example, the non-spherical weighting agents may have physical shapes resembling, but not limited to, platelets, shavings, fibers, flakes, ribbons, rods, strips, spheroids, toroids, pellets, tablets, or any other suitable shape.

In some embodiments, the weighting agents may have an average particle size distribution (i.e., a d50) in the range of a lower limit of about 0.05 micrometer (μm), 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, and 20 μm to an upper limit of about 35 μm, 34 μm, 33 μm, 32 μm, 31 μm, 30 μm, 29 μm, 28 μm, 27 μm, 26 μm, 25 μm, 24 μm, 23 μm, 22 μm, 21 μm, and 20 μm, encompassing any value and subset therebetween. For example, the weighting agents may have a d50 in the range of about 1 μm to about 20 μm, or about 1 μm to about 15 μm, or about 1 μm to about 10 μm, or about 1 μm to about 5 μm, or about 1 μm to about 2.5 μm, encompassing any value and subset therebetween, without departing from the scope of the present disclosure.

The weighting agent may be included in the running fluid in any amount necessary to achieve the rheology attributes described herein of having a specific gravity of about 1.05 to about 3.0 and a 600 rpm shear stress of less than about 26.3 Pa, without departing from the scope of the present disclosure. The amount of weighting agent will thus depend on the selected base fluid, the selected weighting agent, and any additional additives included in the running fluids, as described below. In some embodiments, the weighting agent may be present in the running fluid of the embodiments described herein in an amount in the range of from a lower limit of about 2%, 4%, 6%, 8%, 10%, 12%, 14%, 16%, 18%, 20%, 22%, 24%, 26%, 28%, 30%, 32%, 34%, 36% to an upper limit of about 76%, 74%, 72%, 70%, 68%, 66%, 64%, 62%, 60%, 58%, 56%, 54%, 52%, 50%, 48%, 46%, 44%, 42%, 40%, 38%, and 36%, by weight of the running fluid, encompassing any value and subset therebetween. In some instances, for example, the base fluid may be an oil base fluid and the weighting agent may be present in the running fluid in an amount in the range of from about 6% to about 76%. In other instances, for example, the base fluid may be an aqueous base fluid, and the weighting agent may be present in the running fluid in an amount in the range of from about 2% to about 74%.

In some embodiments, the running fluids of the present disclosure may further include an additive selected from the group consisting of a salt, a wetting agent, and any combination thereof. The salt may be used in combination with the base fluid, such as to form a brine base fluid, and may impart density, shale stability, hydrate suppression, solids suspension, osmotic balance, and the like to the running fluid. Suitable salts may include, but are not limited to, calcium chloride, sodium chloride, sodium bromide, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, and any combination thereof. In some embodiments, salt may be present in the running fluid of the embodiments described herein in an amount in the range of from any amount % by weight of the running fluid, including its exclusion, to saturation, encompassing any value and subset therebetween. For example, in some embodiments, the salt may be present in the range of from a lower limit of about 0.001% by weight of the running fluid to an upper limit of saturation, encompassing any value and subset therebetween. The saturation amount will depend upon the type of salt selected and the remaining components of the running fluids described herein.

The wetting agent additive may be included in the running fluid described herein to impart improved rheology, solids-to-base fluid compatibility, reduced settling of any solids, shale stability, corrosion resistance, and the like to the running fluid. The wetting agents for use in the running fluids may be water wetting and/or oil wetting, which may be used regardless of the type of base fluid selected for the running fluid. Suitable wetting agents may include, but are not limited to, tetrasodium pyrophosphate (TSPP), a non-ionic ethoxylated fatty alcohol, an anionic sulfate salt of an ethoxylated fatty alcohol, a hydroxyalkylcellulose, a partially hydrolyzed polyvinyl acetate, a lignosulfonate, an oxidized fatty acid, a saturated fatty acid-based imidazoline, sodium hexametaphosphate, poly (vinyl pyrrolidone), sodium stearate, sodium oleate, triethanolamine, octadecylamine, p-(t-octyl) phenol, sodium heptadecyl sulfate, sodium-p-(t-octyl) benzene sulfonate, tetrabutyl phosphonium chloride, polyethylene glycol, trimethyl lauryl ammonium iodide, a fatty polyamide, a condensation product of a polyethyleneamine and a fatty acid, and any combination thereof. An example of a suitable commercially available wetting agent for use in the running fluids described herein may include, but is not limited to, EZ MUL® NT, an oil wetting agent of a fatty polyamide, available from Halliburton Energy Services, Inc. in Houston, Tex. In some embodiments, the wetting agent may be present in the running fluid of the embodiments described herein in an amount in the range of from a lower limit of about 0.001%, 0.005%, 0.01%, 0.05%, 0.1%, 0.5%, 1%, 1.25%, 1.5%, 1.75%, 2%, and 2.25% to an upper limit of about 5%, 4.75%, 4.5%, 4.25%, 4%, 3.75%, 3.5%, 3.25%, 3%, 2.75%, 2.5%, and 2.25% by volume of the running fluid, encompassing any value and subset therebetween.

In various embodiments, systems configured for preparing, transporting, and delivering the running fluid described herein to a downhole location during a tubular running operation are described. In some embodiments, as described above, the tubular running operation may be in preparation for a cementing operation, a production screen operation, a drilling operation, and the like. In various embodiments, the systems may comprise a pump fluidly coupled to a tubular (e.g., a casing, a liner, a screen, etc.) extending into a wellbore penetrating a subterranean formation, the tubular may be configured to circulate or otherwise convey the running fluid described herein. In other embodiments (not shown), the tubular running fluid may be introduced into the subterranean formation and circulated along the exterior of the tubular only to deliver the tubular to a desired downhole location. The pump may be, for example, a high pressure pump or a low pressure pump, which may depend on, inter alia, the composition of the running fluid, the length and diameter of the tubular, the composition of a subsequent cementing fluid, and the like.

In some embodiments, the systems described herein may further comprise a mixing tank arranged upstream of the pump and in which the running fluid is formulated. In various embodiments, the pump (e.g., a low pressure pump, a high pressure pump, or a combination thereof) may convey the running fluid from the mixing tank or other source of the running fluid to the tubular (i.e., into and/or surrounding the tubular) during a tubular running operation. In other embodiments, however, the running fluid may be formulated offsite and transported to a worksite, in which case the running fluid may be introduced to the tubular via the pump directly from a transport vehicle or a shipping container (e.g., a truck, a railcar, a barge, or the like) or from a transport pipeline. In yet other embodiments, the running fluid may be formulated on the fly at the well site where components of the running fluid are pumped from a transport (e.g., a vehicle or pipeline) and mixed during introduction to the tubular. In any case, the running fluid may be drawn into the pump, elevated to an appropriate pressure, and then introduced to the tubular for delivery of the tubular downhole.

FIG. 1 shows an illustrative schematic of a system that can deliver the running fluid of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a running fluid of the present disclosure may be formulated. Again, in some embodiments, the mixing tank 10 may represent or otherwise be replaced with a transport vehicle or shipping container configured to deliver or otherwise convey the running fluid to the well site. The running fluid may be conveyed via line 12 to wellhead 14, where the running fluid, as shown, enters into the interior of tubular 16 (e.g., a casing, a liner, etc.), tubular 16 extending from wellhead 14 into wellbore 22 penetrating subterranean formation 18. Upon being ejected from tubular 16, the running fluid may subsequently return up the wellbore in the annulus between the tubular 16 and the wellbore 22 as indicated by flow lines 24. In other embodiments, the running fluid may be reverse pumped down through the annulus and up tubular 16 back to the surface, without departing from the scope of the disclosure. Pump 20 may be configured to raise the pressure of the running fluid to a desired degree before its introduction into tubular 16 (or annulus).

It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for subsequent cementing operations after the tubular running operation is complete (e.g., squeeze operations, reverse cementing (where the cement in introduced into an annulus between a tubular and the wellbore and returns to the wellhead through the tubular), and the like).

It is also to be recognized that the disclosed running fluid may also directly or indirectly affect the various downhole equipment and tools that may come into contact with the running fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surfacemounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A method comprising: introducing a running fluid into a subterranean formation, the running fluid comprising a base fluid and a weighting agent and: having a specific gravity in the range of about 1.05 to about 3.0, and a 600 rpm shear stress of less than about 26.3 Pa, wherein the 600 rpm shear stress is measured at a shear rate of 600 rpm and a temperature of about 48.9° C.; and running a tubular into the subterranean formation comprising the running fluid.

Embodiment B

A system comprising: a running fluid within a subterranean formation, the running fluid comprising a base fluid and a weighting agent and: having a specific gravity in the range of about 1.05 to about 3.0, and a 600 rpm shear stress of less than about 26.3 Pa, wherein the 600 rpm shear stress is measured at a shear rate of 600 rpm and a temperature of about 48.9° C.; and a tubular extending into the subterranean formation, the tubular in fluid contact with the running fluid.

Embodiments A and B may have one or more of the following additional elements in any combination:

Element 1:
Further comprising measuring a 3 rpm shear stress at a shear rate of 3 rpm and a temperature of about 48.9° C., and wherein a difference between the 600 rpm shear stress and the 3 rpm shear stress is between about 2.4 Pa to about 26.3 Pa.

Element 2:
Further comprising measuring a 3 rpm shear stress at a shear rate of 3 rpm and a temperature of about 48.9° C., and wherein a difference between the 600 rpm shear stress and the 3 rpm shear stress is between about 2.4 Pa and about 21.5 Pa.

Element 3:
Further comprising measuring a 3 rpm shear stress at a shear rate of 3 rpm and a temperature of about 48.9° C., and wherein a difference between the 600 rpm shear stress and the 3 rpm shear stress is between about 2.4 Pa and about 16.8 Pa.

Element 4:
Further comprising measuring a 3 rpm shear stress at a shear rate of 3 rpm and a temperature of about 48.9° C., and wherein a difference between the 600 rpm shear stress and the 3 rpm shear stress is between about 2.4 Pa and about 12.0 Pa.

Element 5:
Further comprising measuring a 3 rpm shear stress at a shear rate of 3 rpm and a temperature of about 48.9° C., and wherein a difference between the 600 rpm shear stress and the 3 rpm shear stress is between about 2.4 Pa and about 7.2 Pa.

Element 6:
Further comprising measuring a 3 rpm shear stress at a shear rate of 3 rpm and a temperature of about 48.9° C., and wherein a difference between the 600 rpm shear stress and the 3 rpm shear stress is between about 2.4 Pa and about 4.8 Pa.

Element 7:
Wherein the specific gravity of the running fluid is in the range of about 1.8 to about 2.6.

Element 8:
Wherein the specific gravity of the running fluid is in the range of about 1.8 to about 2.4.

Element 9:
Wherein the base fluid is an aqueous base fluid or an oil base fluid.

Element 10:
Wherein the running fluid further comprises an additive selected from the group consisting of a salt, a wetting agent, and any combination thereof.

Element 11:
Wherein the weighting agent has an average particle size distribution (d50) in the range of about 0.05 µm or about 35 µm.

Element 12:
Wherein the subterranean formation comprises a fracture gradient pressure, and further comprising running the tubular into the subterranean formation so as to not exceed the fracture gradient pressure.

Element 13:
Wherein the tubular is selected from the group consisting of a casing string, a liner, a screen, and any combination thereof.

By way of non-limiting example, exemplary combinations applicable to Embodiments A and B include: 1, 7, and 11; 2, 8, 11, and 12; 3 and 13; 4 and 9; 5, 7, and 10; 6 and 12; and the like.

To facilitate a better understanding of the embodiments of the present disclosure, the following examples of preferred or representative embodiments are given. In no way should the following examples be read to limit, or to define, the scope of the disclosure.

Example 1

In this example, three test fluids (TF1, TF2, and TF3) having a specific gravity of 2.2 were prepared and tested for their rheological properties for use as a running fluid according to the embodiments described herein. The test fluids comprise one or more of an aqueous base fluid of a 200,000 parts per million (ppm) $CaCl_2$ brine in fresh water, a wetting agent of EZ MUL® NT, a wetting agent of 2% TSPP in fresh water (i.e., an aqueous base fluid), and the weighting agent CIMBAR® UF, according to Table 1 below. The $CaCl_2$ brine used in formulating TF1 and TF3 was prepared using 56.8 grams (g) of $CaCl_2$ in 218.6 g of fresh water. The $CaCl^2$ brine used in formulating TF2 was prepared using 52.7 g of $CaCl^2$ and 202.9 g of fresh water. The symbol "-" indicates that the component was not included in a particular treatment fluid.

TABLE 1

|     | CaCl² Brine | EZ MUL ® NT | 2% TSPP | CIMBAR ® UF |
| --- | --- | --- | --- | --- |
| TF1 | 0.099 cubic meters (m³) | — | — | 224.71 kilograms (kg) |
| TF2 | 0.092 m³ | 6.80 kg | — | 226.84 kg |
| TF3 | 0.099 m³ | — | 62.46 kg | 224.71 kg |

The rheological properties of the treatment fluids were evaluated after aging by hot rolling at 66.6° C. (150° F.) for 16 hours. Rheology data was obtained using a FANN® 35A Viscometer at 48.9° C. (120° F.) by measuring the shear stress of the bob at shear rates between 3 rpm to 600 rpm (units: lb/100 ft²), determining the plastic viscosity (PV) (units: centipoise (cP)), the yield point (YP) (units: lb/100 ft²), and the low shear yield point (Yz) (units: lb/100 ft²). The PV is determined by subtracting the 300 rpm shear stress from the 600 rpm yield stress. The YP is determined by subtracting the PV from the 300 rpm shear stress. The Yz is determined by multiplying the 3 rpm shear stress readying by two and then subtracting the 6 rpm shear stress.

The 10 second (s) gel and 10 minute (min) gel were measured by allowing TF1 to remain static for 10 s or 10 min, respectively, and, then, measuring the maximum deflection at 3 rpm with the FANN® 35A Viscometer (units: lb/100 ft²). The rheology results are reported in Table 2 below.

TABLE 2

|     | TF1 | TF2 | TF3 |
| --- | --- | --- | --- |
| 600 rpm | 139 | 112 | 54 |
| 300 rpm | 117 | 86 | 45 |
| 200 rpm | 108 | 75 | 41 |
| 100 rpm | 96 | 62 | 36 |
| 6 rpm | 71 | 41 | 29 |
| 3 rpm | 61 | 40 | 25 |
| PV | 22 | 26 | 9 |
| YP | 95 | 60 | 36 |
| Yz | 51 | 39 | 21 |
| 10 s gel | 61 | 37 | 26 |
| 10 min gel | 65 | 37 | 35 |

Figure 2:
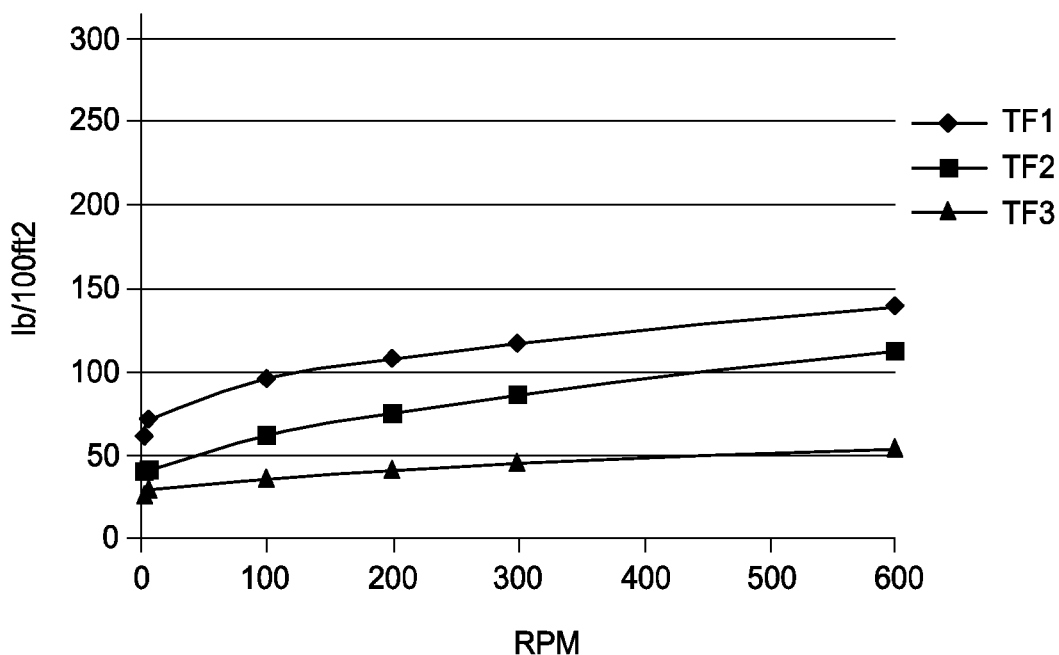
FIG. 2 illustrates the rheological profile for a running fluid, according to one or more embodiments of the present disclosure.

As shown, TF3 meets the requirement of having a specific gravity between about 1.05 and about 3.0, and a 600 rpm shear stress of less than about 55 lb/100 ft². Additionally, TF3 additionally has a difference between the 600 rpm shear stress and the 3 rpm shear stress of 29 lb/100 ft², a PV of only 9 cP and a YP of 36 lb/100 ft². Accordingly, TF3 may be used as a running fluid according to the methods described in the present disclosure and exhibits shear thinning rheological behavior. Indeed, as shown in FIG. 2, the flattened rheological profile, indicating such shear thinning behavior, is illustrated and may be attributed to the addition of the relatively small amount of TSPP wetting agent (1% by volume of the liquid portion (bwlq)) to TF3.

Example 2

In this example, three test fluids (TF4, TF5, and TF6) having a specific gravity of 2.2 were prepared and tested for their rheological properties for use as a running fluid according to the embodiments described herein. The test fluids comprise one or more of a fresh water aqueous base fluid, a wetting agent of EZ MUL® NT, a wetting agent of 2% TSPP in fresh water (i.e., an aqueous base fluid), and the weighting agent CIMBAR® UF, according to Table 3 below.

TABLE 3

|     | Fresh Water | EZ MUL ® NT | 2% TSPP | CIMBAR ® UF |
| --- | --- | --- | --- | --- |
| TF4 | 100.06 kg | — | — | 249.52 kg |
| TF5 | 92.90 kg | 6.80 kg | — | 249.88 kg |
| TF6 | 50.03 kg | — | 50.03 kg | 249.52 kg |

The rheological properties of the treatment fluids were evaluated after aging by hot rolling at 66.6° C. (150° F.) for 16 hours, as described above in Example 1. The rheology results are reported in Table 4 below.

TABLE 4

|     | TF4 | TF5 | TF6 |
| --- | --- | --- | --- |
| 600 rpm | >300 | 153 | 15 |
| 300 rpm | >300 | 129 | 9 |
| 200 rpm | 285 | 120 | 7.5 |
| 100 rpm | 265 | 107 | 5 |
| 6 rpm | 130 | 64 | 4.5 |
| 3 rpm | 78 | 50 | 3.5 |
| PV | N/A | 24 | 6 |
| YP | N/A | 105 | 3 |
| Yz | 26 | 36 | 2.5 |
| 10 s gel | 68 | 54 | 12 |
| 10 min gel | 108 | 68 | 18 |

Figure 3:
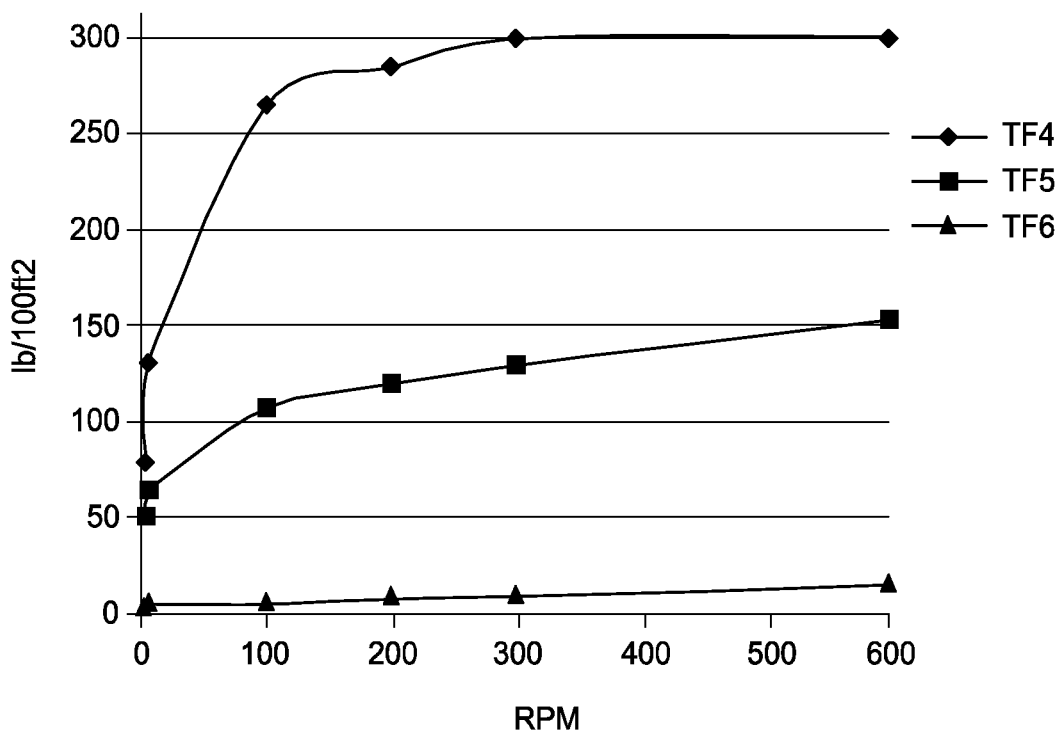
FIG. 3 illustrates the rheological profile for a running fluid, according to one or more embodiments of the present disclosure.

Similar to Example 1, the TF6 fluid comprising TSPP wetting agent demonstrates a flat rheological profile having a specific gravity of between about 1.05 and about 3.0, and a 600 rpm reading of less than about 55 lb/100 ft², and thus may be used as a running fluid as described herein. The flattened rheological profile of TF6, indicating its shear thinning behavior, is illustrated in FIG. 3 and may be again attributed to the addition of the relatively small amount of TSPP wetting agent (1% bwlq) to TF6.

Example 3

In this example, four test fluids (TF7, TF8, TF9, and TF10) having a specific gravity of 2.2 were prepared and tested for their rheological properties for use as a running fluid according to the embodiments described herein. Each of the test fluids comprise a fresh water aqueous base fluid, various concentrations of a wetting agent of 2% TSPP in fresh water (i.e., an aqueous base fluid), and the weighting agent CIMBAR® UF, according to Table 5 below.

TABLE 5

|     | Fresh Water | 2% TSPP | CIMBAR ® UF |
| --- | --- | --- | --- |
| TF7 | 75.07 kg | 25.04 kg (0.5% bwlq) | 249.52 kg |
| TF8 | 87.54 kg | 12.52 kg (0.25% bwlq) | 249.52 kg |
| TF9 | 46.90 kg | 46.90 kg (1% bwlq) | 287.26 kg |
| TF10 | — | 100.06 kg (2% bwlq) | 249.52 kg |

The rheological properties of the treatment fluids were evaluated after aging by hot rolling at 66.6° C. (150° F.) for 16 hours, as described above in Example 1. The rheology results are reported in Table 6 below.

TABLE 6

| | TF7 | TF8 | TF9 | TF10 |
|---|---|---|---|---|
| 600 rpm | 168 | 260 | 85 | 12 |
| 300 rpm | 149 | 233 | 76 | 7 |
| 200 rpm | 140 | 219 | 71 | 5 |
| 100 rpm | 129 | 204 | 67 | 3 |
| 6 rpm | 96 | 95 | 70 | 2.5 |
| 3 rpm | 62 | 50 | 70 | 2 |
| PV | 19 | 27 | 9 | 5 |
| YP | 130 | 206 | 67 | 2 |
| Yz | 28 | 5 | 70 | 1.5 |
| 10 s gel | 43 | 51 | 72 | 2 |
| 10 min gel | 49 | 88 | 101 | 6 |

Figure 4:
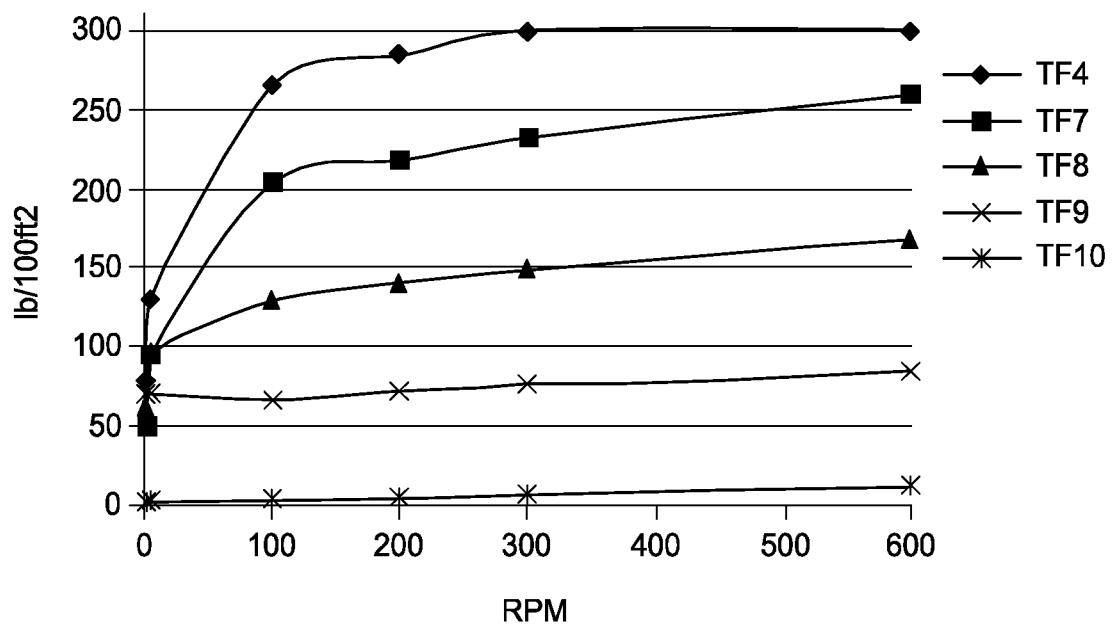
FIG. 4 illustrates the rheological profile for a running fluid, according to one or more embodiments of the present disclosure.

As shown in Table 6, slight increases in the concentration of the 2% TSPP result in severely flattened rheological profiles. Indeed, with only 2% bwlq of the 2% TSPP in TF10, the 600 rpm shear stress is well below about 55 lb/100 ft$^2$ at a specific gravity between about 1.05 and about 3.0. TF10 is accordingly suitable for use as a running fluid described in the present disclosure. Moreover, the result of the effect of the small concentration changes of the TSPP wetting agent indicate that the running fluid may be made to be very thick, but because of its shear thinning properties remains pumpable simply by adjusting the wetting agent concentration. The flattened rheological profile of the treatment fluids with slight changes in the concentration of the TSPP wetting agent is illustrated in FIG. 4. TF4 is also included in FIG. 4 to demonstrate the rheological profile of a fluid without TSPP.

Example 4

In this example, three test fluids (TF11, TF12, and TF13) having varying specific gravities were prepared and tested for their rheological properties for use as a running fluid according to the embodiments described herein. Each of the test fluids comprise an oil base fluid of DF-1, a wetting agent of EZ MUL® NT, and the weighting agent CIMBAR® UF, according to Table 7 below.

TABLE 7

| | Specific Gravity | DF-1 | EZ MUL ® NT | CIMBAR ® UF |
|---|---|---|---|---|
| TF11 | 2.2 | 75.42 kg | 3.63 kg | 270.48 kg |
| TF12 | 2.4 | 75.42 kg | 3.63 kg | 361.19 kg |
| TF13 | 2.6 | 75.42 kg | 3.63 kg | 451.91 kg |

The rheological properties of the treatment fluids were evaluated as described above in Example 1. The rheology results are reported in Table 8 below.

TABLE 8

| | TF11 | TF12 | TF13 |
|---|---|---|---|
| 600 rpm | 23 | 53 | 78 |
| 300 rpm | 12 | 28 | 43 |
| 200 rpm | 8 | 20 | 31 |
| 100 rpm | 5 | 11 | 19 |
| 6 rpm | 1 | 3 | 5 |
| 3 rpm | 0 | 2 | 4 |
| PV | 11 | 25 | 35 |
| YP | 1 | 3 | 8 |
| Yz | −1 | 1 | 3 |
| 10 s gel | 0 | 3 | 6 |
| 10 min gel | 0 | 4 | 7 |

Figure 5:
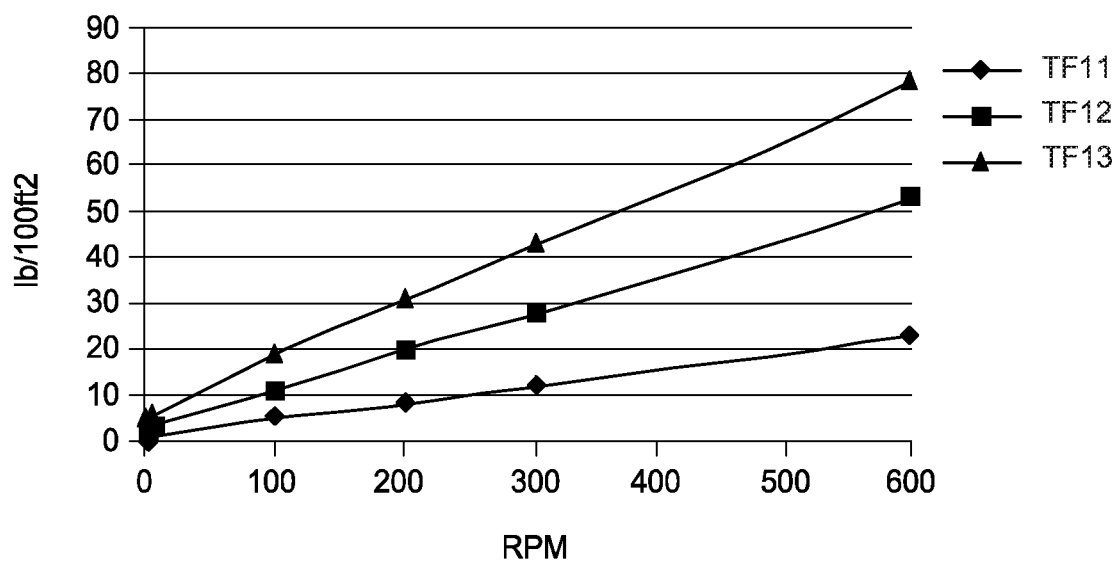
FIG. 5 illustrates the rheological profile for a running fluid, according to one or more embodiments of the present disclosure.

As shown in Table 8, TF11 and TF12 demonstrate the rheological properties for a running fluid, as described herein. Specifically, both have a 600 rpm shear stress reading below about 55 lb/100 ft$^2$ and have specific gravities between about 1.05 and about 3.0, and each shows the flattened rheological profile indicative of a shear thinning fluid, as desired. Moreover, despite the high amounts of weighting agent, they resist sag and exhibit the desired rheological profile, as shown in FIG. 5.

Therefore, the present disclosure is well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   preparing a running fluid consisting essentially of a base fluid, a wetting agent comprising tetrasodium pyrophosphate, and a weighting agent, wherein the running fluid has a specific gravity in the range of about 1.05 to about 3.0;
   determining the running fluid has a shear stress that is less than about 26.3 Pa, at a shear rate of 600 rpm, and a temperature of about 48.9° C.;
   introducing the running fluid into a subterranean formation; and
   running a tubular into the subterranean formation comprising the running fluid.

2. The method of claim 1, wherein a difference between the shear stress at the shear rate of 600 rpm and a shear stress at a shear rate of 3 rpm is between about 2.4 Pa to about 26.3 Pa.

3. The method of claim 1, wherein a difference between the shear stress at the shear rate of 600 rpm and a shear stress at a shear rate of 3 rpm is between about 2.4 Pa and about 21.5 Pa.

4. The method of claim 1, wherein a difference between the shear stress at the shear rate of 600 rpm and a shear stress at a shear rate of 3 rpm is between about 2.4 Pa and about 16.8 Pa.

5. The method of claim 1, wherein a difference between the shear stress at the shear rate of 600 rpm and a shear stress at a shear rate of 3 rpm is between about 2.4 Pa and about 12.0 Pa.

6. The method of claim 1, wherein a difference between the shear stress at the shear rate of 600 rpm and a shear stress at a shear rate of 3 rpm is between about 2.4 Pa and about 7.2 Pa.

7. The method of claim 1, wherein a difference between the shear stress at the shear rate of 600 rpm and a shear stress at a shear rate of 3 rpm is between about 2.4 Pa and about 4.8 Pa.

8. The method of claim 1, wherein the specific gravity of the running fluid is in the range of about 1.8 to about 2.6.

9. The method of claim 1, wherein the specific gravity of the running fluid is in the range of about 1.8 to about 2.4.

10. The method of claim 1, wherein the base fluid is an aqueous base fluid or an oil base fluid.

11. The method of claim 1, wherein the running fluid further comprises a salt.

12. The method of claim 1, wherein the weighting agent has an average particle size distribution (d50) in the range of about 0.05 μm or about 35 μm.

13. The method of claim 1, wherein the subterranean formation comprises a fracture gradient pressure, and further comprising running the tubular into the subterranean formation so as to not exceed the fracture gradient pressure.

14. The method of claim 1, wherein the tubular is selected from the group consisting of a casing string, a liner, a screen, and any combination thereof.

15. A system comprising:
a running fluid within a subterranean formation, the running fluid consisting essentially of a base fluid, a wetting agent comprising tetrasodium pyrophosphate, and a weighting agent, wherein the running fluid has a specific gravity in the range of about 1.05 to about 3.0;
means for determining the 600 rpm shear stress of the running fluid, wherein the means for determining determines that the running fluid has a shear stress that is less than about 26.3 Pa, at a shear rate of 600 rpm, and a temperature of about 48.9° C.; and
a tubular extending into the subterranean formation, the tubular in fluid contact with the running fluid.

16. The system of claim 15, further comprising means for determining a shear stress at a shear rate of 600 rpm and a shear stress at a shear rate of 3 rpm of the running fluid is between about 2.4 Pa and about 26.3 Pa.

17. The system of claim 15, wherein the specific gravity of the running fluid is in the range of about 1.8 to about 2.6.

18. The system of claim 15, wherein the base fluid is an aqueous base fluid or an oil base fluid.

19. The system of claim 15, wherein the running fluid further comprises a salt.

20. The system of claim 15, wherein the running fluid comprises a running fluid recovered from a subterranean operation.

21. A method comprising:
determining one or more rheology parameters for a running fluid, wherein the one or more rheology parameters comprises a shear stress that is less than about 26.3 Pa, at a shear rate of 600 rpm, and a temperature of about 48.9° C.;
preparing the running fluid consisting essentially of a base fluid, a wetting agent comprising tetrasodium pyrophosphate, and a weighting agent, wherein the running fluid has a specific gravity in the range of about 1.05 to about 3.0;
introducing the running fluid into a subterranean formation; and
running a tubular into the subterranean formation comprising the running fluid.

* * * * *